United States Patent [19]
Saito

[11] Patent Number: 5,216,545
[45] Date of Patent: Jun. 1, 1993

[54] OBJECTIVE LENS SYSTEM FOR MICROSCOPES

[75] Inventor: Yoshiharu Saito, Tokyo, Japan

[73] Assignee: Olympus Optical Co., Ltd., Tokyo, Japan

[21] Appl. No.: 839,300

[22] Filed: Feb. 26, 1992

Related U.S. Application Data

[63] Continuation of Ser. No. 704,657, May 20, 1991, abandoned, which is a continuation of Ser. No. 377,226, Jul. 10, 1989, abandoned.

[30] Foreign Application Priority Data

Jul. 11, 1988 [JP] Japan .................. 63-171030
Jul. 13, 1988 [JP] Japan .................. 63-172654

[51] Int. Cl.$^5$ ............................. G02B 21/02
[52] U.S. Cl. .................... 359/661; 359/660; 359/656; 359/708
[58] Field of Search .............. 350/414, 432, 507; 359/656, 708, 368, 660, 661

[56] References Cited

U.S. PATENT DOCUMENTS 4,784,478 11/1988 Takada .................. 350/414

FOREIGN PATENT DOCUMENTS

| | | |
|---|---|---|
| 40-24318 | 10/1940 | Japan . |
| 43-15237 | 6/1943 | Japan . |
| 50-39564 | 4/1975 | Japan . |
| 53-135661 | 11/1978 | Japan . |
| 54-34252 | 3/1979 | Japan . |
| 57-59527 | 12/1982 | Japan . |
| 58-111914 | 7/1983 | Japan . |

Primary Examiner—Bruce Y. Arnold
Assistant Examiner—Hung Xuan Dang
Attorney, Agent, or Firm—Cushman, Darby & Cushman

[57] ABSTRACT

An abjective lens system for microscopes consisting of a lens component having a convex surface on the image side and arranged on the extremely object side, and at least one lens component arranged on the image side of said lens component and comprising a cemented doublet. Said objective lens system for microscopes has a simple composition, consists of a small number of lens elements, and has favorably corrected spherical aberration, coma, curvature of field, etc.

49 Claims, 10 Drawing Sheets

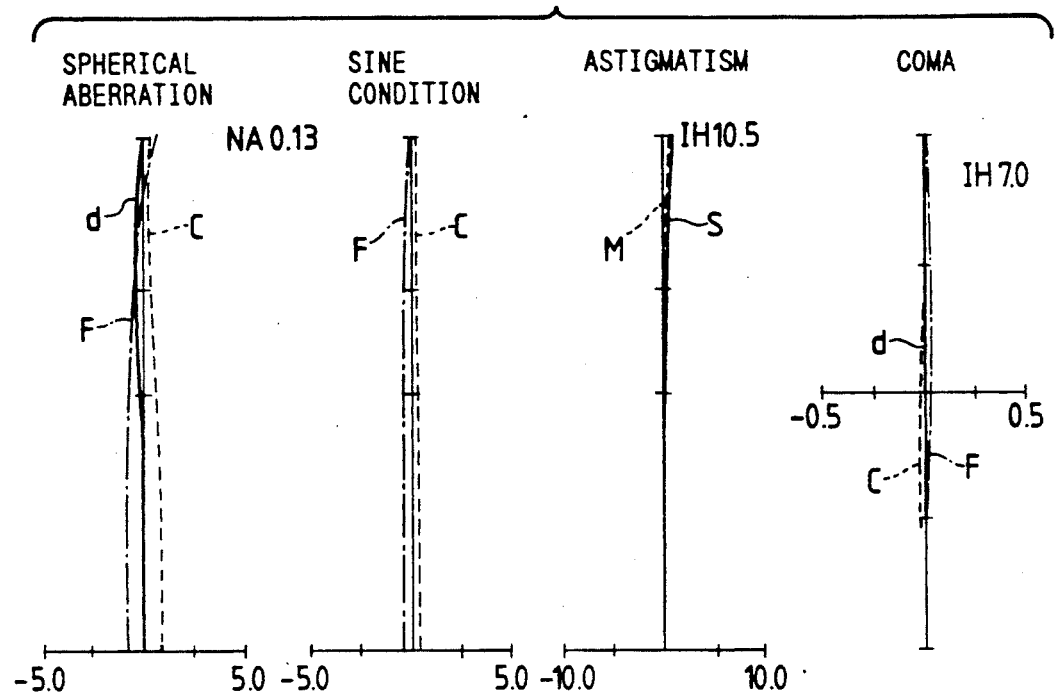
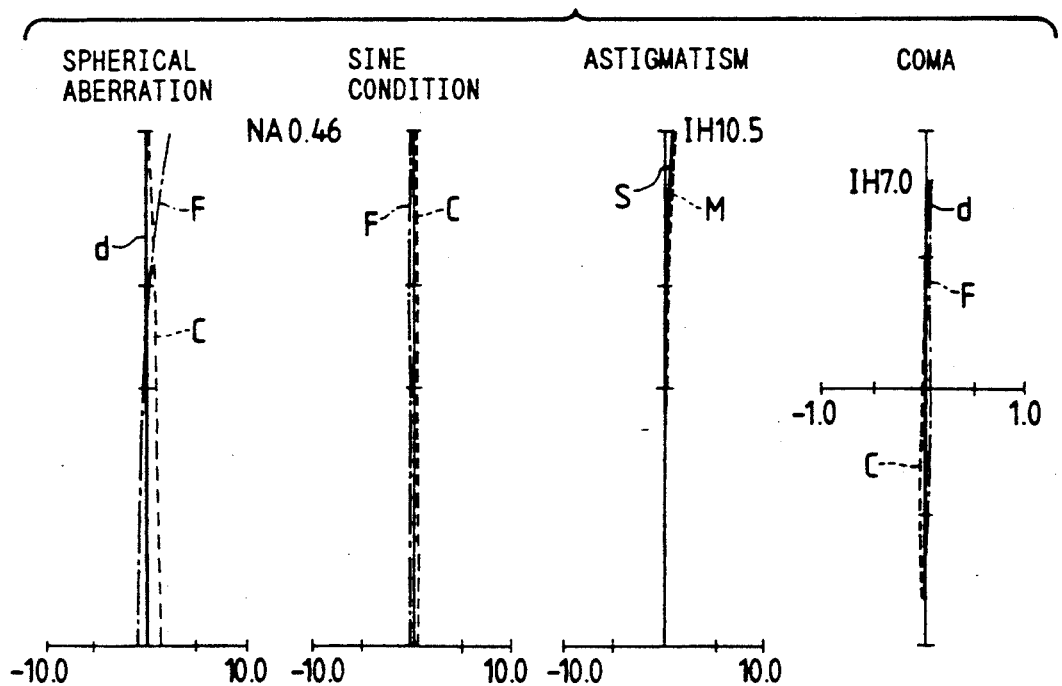

OBJECTIVE LENS SYSTEM FOR MICROSCOPES

This is a continuation of Application No. 07/704,657, filed on May 20, 1991, which was abandoned upon the filing hereof; which is a continuation of 07/377,226 filed Jul. 10, 1989, now abandoned.

BACKGROUND OF THE INVENTION a) Field of the invention

The present invention relates to an objective lens system for microscopes having a large numerical aperture (NA), and so designed as to favorably correct the paraxial and offaxial aberrations.

b) Description of the prior art

Since it is demanded for objective lens systems for microscopes to have a capability to resolve images of objects almost to the limit of diffraction, severer requirements for correcting aberrations are imposed on the objective lens systems for microscopes to correct aberrations more favorably in the objective lens systems for microscopes than in photographic lens systems for cameras. Further, as compared with condenser lens systems for optical disks, objective lens systems for microscopes must correct the paraxial aberrations up to high portions of images as well as the chromatic aberration, thereby being subjected to severe requirements for correction of the aberrations. For this reason, most of objective lens systems for microscopes have complicated compositions and consist of large numbers of lens elements.

As objective lens systems for microscopes having relatively simple compositions and consisting of small numbers of lens elements, there are known the lens systems disclosed by Japanese Examined Published Patent Applications No. 59527/57, No. 15237/43 and No. 24318/40. However, these objective lens systems for microscopes have the offaxial aberrations such as curvature of field which are not corrected sufficiently and are designed for small numerical apertures.

Further, as the objective lens systems having the compositions similar to that of the objective lens system according to the present invention, there are known the lens systems disclosed by Japanese Unexamined Published Patent Applications No. 111914/58, No. 39564/50, No. 34252/54 and No. 135661/53.

Also in these conventional objective lens systems, the offaxial aberrations are not corrected so favorably though the spherical aberration is corrected favorably.

SUMMARY OF THE INVENTION

A primary object of the present invention is to provide an objective lens system for microscopes consisting of a relatively small number of lens elements, and having favorably corrected aberrations and a large numerical aperture.

The objective lens system for microscopes according to the present invention consists of a plural number of lens components including a cemented doublet, out of which the lens component arranged on the extremely object side has a convex surface on the image side. Further, at least one of the lens surfaces used in the objective lens system is designed as an aspherical surface.

The aspherical surface used in the objective lens system according to the present invention has, when the spherical surface in contact with the aspherical surface at the vertex thereof i.e. the reference sphere has positive refractive power, has such a shape as to weaken the positive refractive power as the surface portions are farther from the optical axis. When reference sphere has negative refractive power, the aspherical surface has such a shape as to strengthen the negative refractive power as the surface portions are farther from the optical axis.

In the objective lens system for microscopes having the composition described above, the lens component arranged on the extremely object side and having a convex surface on the image side serves for reducing the angle formed between the marginal ray emitted from an object and the optical axis while preventing production of aberrations. Further, the cemented doublet serves for correcting the chromatic aberration. Furthermore, the aspherical surface has a very important roll for correcting aberrations.

An optical system for microscopes is generally composed of an objective lens system and an eyepiece. Therefore, it is necessary to correct aberrations in an objective lens system for microscopes taking into consideration the performance of the eyepiece to be used in combination therewith. Due to the restrictions posed on the number of lens components, outside diameter, total length and so on, an eyepiece generally has a relatively simple composition consisting of a combination of positive lens elements. Accordingly, the eyepiece has dominant positive refractive power and a large Petzval's sum. It is therefore necessary to adequately correct this Petzval's sum by an objective lens system so as to obtain a flat image surface in the optical system for microscopes as a whole.

When lens surfaces are numbered consecutively by 1, 2, ... in the order from the object side, power of the i'th surface is represented by $\phi_i$, height of the paraxial ray incident on the i'th surface is designated by $h_i$ and refractive index of the lens element comprising the i'th surface is denoted by $n_i$ in an objective lens system, power $\phi$ of the objective lens system as a whole can be expressed by the following formula (i):

$$\phi = \sum_i h_i \phi_i > 0 \tag{i}$$

Further, Petzval's sum of the objective lens system can be expressed by the following formula (ii):

$$P = \sum_i \frac{\phi_i}{n_i} < 0 \tag{ii}$$

When $n_i$ is not taken into consideration, it is necessary for correcting the Petzval's sum to strengthen powers of concave surfaces, reduce heights of rays on the concave surfaces, weaken powers of convex surfaces and increase heights of rays on the convex surfaces.

Powers of positive lens elements and negative lens elements arranged in a lens system are determined almost by focal length of the lens system. Therefore, correction of the Petzval's sum must be performed mainly by adjusting heights of the rays incident on the individual lens elements. When height of a ray incident on a convex surface is increased, however, spherical aberration and coma produced by the convex surface are aggravated. Further, when height of a ray incident on a concave surface is reduced, spherical aberration and coma produced in the reverse sign by the concave surface are reduced, thereby making it impossible to cancel the spherical aberration and coma produced by the convex surface. Accordingly, spherical aberration and coma produced by the lens system as a whole are aggravated. For this reason, it is impossible to correct the spherical aberration and coma produced in a lens system consisting only of spherical lens elements without increasing number of lens elements.

When an objective lens system uses an aspherical surface that is, the reference sphere has negative refractive power which is designed as a convex surface, it is possible to reduce the spherical aberration and coma to be produced by the convex surface so as to minimize the spherical aberration and coma in the objective lens system as a whole by designing the aspherical surface in such a shape as to weaken refractive power of the surface as the surface portions are farther from the optical axis.

Further, when the aspherical surface is designed as a concave surface, it is possible to reduce the spherical aberration and coma in the objective lens system as a whole by designing the aspherical surface in such a shape as to strengthen refractive power of the surface as the surface portions are farther from the optical axis for increasing the spherical aberration and coma produced in the reverse sign by the concave surface.

When the lens component arranged on the extremely object side in the objective lens system according to the present invention is designed as a meniscus lens component having a concave surface on the object side, it is effective to design any one surface of this meniscus lens component as an aspherical surface since this lens component has an important roll to correct aberrations in the objective lens system as a whole, concretely, the object side concave surface of the meniscus lens component has a function to correct Petzval's sum, whereas the image side convex surface thereof contributes to correction of spherical aberration and coma.

It is desirable to design the aspherical surface to be used in the objective lens system so as to satisfy the following condition (1):

$$0.0005 < |\Delta x/y_A| < 0.08 \qquad (1)$$

wherein the reference symbol $y_A$ represents the maximum height of ray on the aspherical surface and the reference symbol $\Delta x$ designates deviation in the direction along the optical axis at the maximum height of ray $y_A$ between the aspherical surface and the reference sphere in contact with the aspherical surface at the vertex thereof.

In addition, when the optical axis is taken as the x axis, and the straight line passing through the vertex of the aspherical surface and perpendicular to the optical axis is taken as the y axis, shape of the aspherical surface to be used in the objective lens system is expressed by the following formula (A):

$$x = \frac{y^2/R}{1 + \sqrt{1 - (y/R)^2}} + \qquad (A)$$

$$By^2 + Cy^4 + Dy^6 + Ey^8 + Fy^{10} + \ldots$$

wherein the reference symbol R represents radius of curvature at the vertex of the aspherical surface, i.e. the radius of curvature of the reference sphere and the reference symbols B, C, D, E, F, ... designate the coefficients of aspherical surface.

When the maximum height of ray is expressed as $y_A$ in the formula mentioned above, $\Delta x$ is given as follows:

$$\Delta x = By_A{}^2 + Cy_A{}^4 + Dy_A{}^6 + \ldots$$

If the lower limit of 0.0005 of the above-mentioned condition (1) is exceeded, the aspherical surface will produce less spherical aberration and coma, or have lower effect for correcting the aberrations, thereby making it necessary to reduce the spherical aberration and coma to be produced by the spherical surfaces. When an attempt is made to reduce these aberrations to be produced by the spherical surfaces, however, it will be impossible to obtain a negative petzval's sum.

If the upper limit of 0.08 of the condition (1) is exceeded, in contrast, the aspherical surface will produce more spherical aberration and coma, thereby making it difficult to correct the spherical aberration and coma in the objective lens system as a whole.

For favorably correcting the offaxial aberrations including the Petzval's sum in the objective lens system for microscopes according to the present invention, it is desirable to design said meniscus lens component so as to satisfy the following conditions (2) and (3):

$$0.2 < |r_1/D_1| < 6.0 \qquad (2)$$

$$D_2/f > 0.1 \qquad (3)$$

wherein the reference symbol $r_1$ represents radius of curvature on the object side surface of said meniscus lens component, the reference symbol $D_1$ designates distance as measured from an object to the object side surface of said meniscus lens component, the reference symbol $D_2$ denotes thickness of said meniscus lens component and the reference symbol f represents focal length of the objective lens system as a whole.

If the lower limit of 0.2 of the condition (2) is exceeded, curvature on the concave surface of said meniscus lens component will be too strongs thereby making it difficult to correct the spherical aberration and coma by using an aspherical surface. If the upper limit of 6.0 of the condition (2) or the lower limit of 0.1 of the condition (3) is exceeded, Petzval's sum will have a large positive value, thereby making it difficult to correct curvature of field.

Chromatic aberration can be corrected favorably by designing said meniscus lens component arranged on the extremely object side as a cemented doublet consisting of a positive lens element and a negative lens element.

Further, it is effective for correcting chromatic aberration in the objective lens system according to the present invention to design the lens component arranged on the extremely image side as a positive cemented doublet consisting of a positive lens element and a negative lens element, and satisfying the following condition (4):

$$\nu_{2p} - \nu_{2n} > 10 \qquad (4)$$

wherein the reference symbols $\nu_{2p}$ and $\nu_{2n}$ represent Abbe's numbers of the positive lens element and the negative lens element respectively of the cemented doublet arranged on the extremely image side.

When the objective lens system according to the present invention comprises a lens component arranged on the extremely object side and having a convex surface on the image side, a cemented doublet arranged thereafter, and at least two aspherical surfaces, it is effective to design at least one of said aspherical surfaces so as to satisfy the following condition (1'):

$$0.003 < |\Delta x/y_A| < 0.3 \quad (1')$$

If the lower limit of 0.003 of the condition (1') is exceeded, the aspherical surfaces will have too low function for correcting the spherical aberration and coma, and it will be impossible to correct the spherical aberration and coma favorably in the objective lens system as a whole without reducing the spherical aberration and coma produced by the spherical lens elements. When the spherical aberration and coma to be produced by the spherical lens elements are reduced, however, Petzval's sum of the spherical lens elements cannot be made negative, thereby making it difficult to correct curvature of field. Further, if the upper limit of 0.3 of the condition (1') is exceeded, in contrast, the spherical aberration and coma to be produced by the aspherical surface will be aggravated and can hardly be corrected.

For correcting aberrations more favorably in the objective lens system of the type described above, it is desirable to arrange a meniscus lens component concave on the image side at a location on the extremely image side, and design said lens component so as to satisfy the following conditions (5) and (6):

$$0.2 < r_n/f < 8 \quad (5)$$

$$0.2 < r_p/f < 8 \quad (6)$$

wherein the reference symbols $r_p$ and $r_n$ represent radii of curvature on the convex surface and the concave surface of the meniscus lens component arranged on the extremely image side, and the reference symbol f designates focal length of the objective lens system as a whole.

The above-mentioned conditions (5) and (6) are adopted for correcting the spherical aberration, coma and curvature of field. If the lower limit of 0.2 of the condition (5) or (6) is exceeded, the spherical aberration and coma to be produced by the spherical surfaces will be aggravated too much for correction by aspherical surface(s). If the upper limit of 8 of the condition (5) or (6) is exceeded, in contrast, Petzval's sum will have a large positive value and curvature of field cannot be corrected.

Further, in order to correct chromatic aberration favorably it is desirable to arrange a positive cemented doublet consisting of a positive lens element and a negative lens element at a location between the lens component arranged on the extremely object side and the lens component arranged on the extremely image side, and design this positive cemented doublet so as to satisfy the following condition (7):

$$\nu_p - \nu_n > 10 \quad (7)$$

wherein the reference symbols $\nu_p$ and $\nu_n$ represent Abbe's numbers of the positive lens element and the negative lens element respectively of the positive cemented doublet arranged at the intermediate location.

If the condition (7) is not satisfied, difference in the longitudinal chromatic aberration between the C-line and the F-line will be enlarged and can hardly be corrected.

In a case where it is especially desired to reduce number of the lens components to a threshold, it is desirable to impart positive refractive power to the lens component arranged on the extremely object side and having a convex surface on the image side, arrange a cemented doublet in the lens system, use at least two aspherical surfaces and design each of these aspherical surfaces so as to satisfy the above-mentioned condition (1') and further the following condition (8):

$$|(I_s + I_{os})/2NA'| < 4 \quad (8)$$

wherein the reference symbol $I_s$ represents a total sum of the third order spherical aberration coefficients of the reference sphere of the aspherical surface and the two surfaces arranged before and after respectively the aspherical surface, the reference symbol $I_{os}$ designates the spherical aberration coefficient of the third order of the portions of the aspherical surface deviated from the spherical surface and the reference symbol NA' denotes numerical aperture on the image side. When the two surfaces are also aspherical, $I_s$ is calculated for each reference sphere of the respective aspherical surfaces.

Now, description will be made on the spherical surface coefficient of the third order. FIG. 11 shows a diagram descriptive of determination of the spherical surface coefficient of the third order in an optical system comprising spherical surfaces only. Based on this diagram, the spherical aberration coefficient of the third order $I_{si}$ of the i'th surface $r_i$ can be expressed as follows:

$$I_{si} = h_i N_i^2 \left(\frac{h_i}{r_i} - u_i\right)^2 \left(\frac{u_i'}{N_i'} - \frac{u_i}{N_i}\right)$$

wherein the reference symbol $h_i$ represents height of the paraxial ray incident on the l'th surface, the reference symbols $u_i$ and $u_i'$, designate angles of incidence and emergence respectively on the l'th surface, the reference symbols $N_i$ and $N_i'$ denote refractive indices of the medium on the side of incidence and the medium on the side of emergence respectively, and the reference symbol $r_i$ represents radius of curvature on the i'th surface.

The above-mentioned $I_s$ and $I_{os}$ are expressed as follows:

$$I_s = I_{si-1} + I_{si} + I_{si+1}$$

$$I_{os} = 8 h_i^4 (N_i' - N_i) C$$

where the reference symbols $I_{si-1}$ and $I_{si+1}$ represents the spherical aberration coefficients of the surfaces located before and after the i'th surface, and the reference symbol C designates the aspherical surface coefficient of the term of the fourth order in the formula of aspherical surface.

Since the objective lens system for microscopes according to the present invention consists of a small number of lens elements as already described above, each of the surfaces of the lens elements has strong refractive power. Accordingly, a single aspherical surface is insufficient for correcting the spherical aberration produced in the objective lens system as a whole, but can correct the spherical aberration produced only by the two surfaces arranged just before and after the aspherical surface. It is therefore necessary to use at least two aspherical surfaces for favorably correcting the spherical aberration produced in the objective lens system as a whole.

If either of the aspherical surfaces cannot satisfy the above-mentioned condition (8), the aspherical surface cannot sufficiently correct the spherical aberration produced by the surfaces arranged before and after the aspherical surface, and the residual spherical aberration must be corrected by another aspherical surface. However, the residual spherical aberration cannot be corrected sufficiently by another aspherical surface, thereby allowing the spherical aberration to inevitably remain in the objective lens system as a whole.

When the objective lens system for microscopes according to the present invention satisfies the condition (8), it is desirable to design the lens system so as to satisfy the following condition (9):

$$0.3 < f_1/f < 1.5$$

wherein the reference symbol f represents focal length of the objective lens system as a whole and the reference symbol $f_1$ designates focal length of the lens component arranged on the extremely object side.

If the lower limit of 0.3 of the condition (9) is exceeded, the lens component arranged on the extremely object side will have too strong refractive power, thereby making it impossible to correct the spherical aberration. If the upper limit of 1.5 of the condition (9) is exceeded, in contrast, the lens component arranged on the extremely object side will have too strong refractive power, thereby making it difficult to correct the offaxial aberrations such as coma and astigmatic difference.

Further, for correcting aberrations more favorably in the objective lens system for microscopes according to the present invention, it is desirable to design the cemented doublet used in the lens system so as to satisfy the following conditions (10), (11) and (12):

$$\nu_{2p} - \nu_{2n} > 10 \qquad (10)$$

$$n_{2n} - n_{2p} > 0.05 \qquad (11)$$

$$0.7 < -\frac{r_p}{f} < 4 \qquad (12)$$

wherein the reference symbols $\nu_{2p}$ and $\nu_{2n}$ represent Abbe's numbers of the positive lens element and the negative lens element respectively of the cemented doublet, the reference symbols $n_{2p}$ and $n_{2n}$ designate refractive indices of the positive lens element and the negative lens element respectively of said cemented doublet, the reference symbol $r_p$ denotes radius of carvature on the air-contacted surface of the positive lens element of said cemented doublet.

The condition (10) is required for correcting the longitudinal chromatic aberration. If the condition (4) is not satisfied, difference in the longitudinal chromatic aberration between the C-line and the F-line will be enlarged and can hardly be corrected.

The condition (11) is adopted for correcting the spherical aberration and coma. Since the objective lens system for microscopes according to the present invention consists of a small number of lens elements, the convex surfaces arranged thereon have strong refractive powers. When the convex surfaces have strong refractive powers, spherical aberration and coma are aggravated for the rays having large NAs, and cannot be corrected even by using the aspherical surfaces. It is therefore necessary to produce spherical aberration and coma in the reverse sign by arranging surfaces having negative refractive powers in the objective lens system so as to correct the spherical aberration and coma favorably in the objective lens system as a whole. However, if the condition (11) is not satisfied, the cemented surface will have too weak negative refractive power, thereby making it difficult to correct the spherical aberration and coma.

The condition (12) is adopted also for correcting the spherical aberration and coma. If the lower limit of 0.7 of the condition (12) is exceeded, curvature will be high on the air-contacted surface of the positive lens element of said cemented doublet, thereby making it difficult to correct the spherical aberration and coma by using the aspherical surfaces. If the upper limit of 4 of the condition (12) is exceeded, in contrast, curvature will be low on said surface and the other surfaces will have too strong refractive powers accordingly, thereby producing spherical aberration and coma which can hardly be corrected by using the aspherical surfaces.

BRIEF DESCRIPTION OF THE DRAWINGS

FIG. 12 through FIG. 21 show curves illustrating aberration characteristics of the Embodiment 1 through 10 respectively of the present invention.

DETAILED DESCRIPTION OF THE PREFERRED EMBODIMENTS

Figure 1:
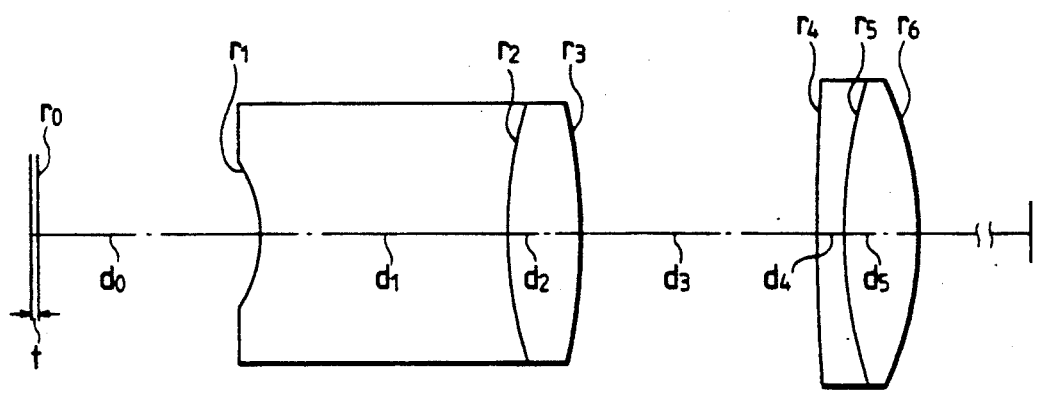
FIG. 1 through FIG. 10 show sectional views illustrating compositions of Embodiments 1 through 10 of the objective lens system for microscopes according to the present invention.

Now, the present invention will be described more detailedly below with reference to the preferred embodiments illustrated in the accompanying drawings and given in the form of numerical data:

Embodiment 1

$f = 26.150$     NA = 0.1300
image height 10.5     $t = 0.17$
$r_0 = \infty$
$d_0 = 11.1497$
$r_1 = -5.6821$
$d_1 = 10.2016$     $n_1 = 1.51728$     $\nu_1 = 69.56$
$r_2 = 16.9161$
$d_2 = 3.0000$     $n_2 = 1.72000$     $\nu_2 = 46.03$
$r_3 = -23.5156$ (aspherical surface)
$d_3 = 9.7926$
$r_4 = 116.5857$
$d_4 = 1.2000$     $n_3 = 1.78472$     $\nu_3 = 25.71$
$r_5 = 21.9835$
$d_5 = 3.0000$     $n_4 = 1.48749$     $\nu_4 = 70.15$
$r_6 = -13.8620$
aspherical surface coefficients
$B = 0$    $C = 0.84862 \times 10^{-4}$    $D = 0.19214 \times 10^{-6}$
$E = 0.11190 \times 10^{-7}$    $F = -0.17943 \times 10^{-9}$ $\left|\frac{\Delta x}{y_A}\right| = 0.01$      $\left|\frac{r_1}{D_1}\right| = 0.51$ $\frac{D_2}{f} = 0.5$      $\nu_{1p} - \nu_{1n} = 23.53$ $\nu_{2p} - \nu_{2n} = 44.44$

Embodiment 2 f = 8.785   NA = 0.4600
image height 10.5   t = 0.17

$r_0 = \infty$
$d_0 = 1.0000$
$r_1 = -2.7369$ (aspherical surface)
$d_1 = 3.0209$   $n_1 = 1.80518$   $\nu_1 = 25.43$
$r_2 = 36.6795$
$d_2 = 2.3200$   $n_2 = 1.88300$   $\nu_2 = 40.78$
$r_3 = -4.7134$
$d_3 = 0.1000$
$r_4 = 22.4407$
$d_4 = 1.0200$   $n_3 = 1.80518$   $\nu_3 = 25.43$
$r_5 = 10.7448$
$d_5 = 3.2000$   $n_4 = 1.49700$   $\nu_4 = 81.61$
$r_6 = -10.5455$
$d_6 = 22.1901$
$r_7 = 76.6325$
$d_7 = 1.3100$   $n_5 = 1.78590$   $\nu_5 = 44.18$
$r_8 = 11.2306$
$d_8 = 2.7000$   $n_6 = 1.60311$   $\nu_6 = 60.70$
$r_9 = -26.8542$ aspherical surface coefficients
B = 0   C = $-0.91098 \times 10^{-2}$
D = $-0.26588 \times 10^{-2}$   E = $-0.19679 \times 10^{-3}$
F = $-0.18049 \times 10^{-3}$ $\left|\dfrac{\Delta x}{y_A}\right| = 0.007$   $\left|\dfrac{r_1}{D_1}\right| = 2.74$ $\dfrac{D_2}{f} = 0.61$   $\nu_{1p} - \nu_{1n} = 56.18$ $\nu_{2p} - \nu_{2n} = 16.52$

Embodiment 3 f = 8.574   NA = 0.4600
image height 10.5   t = 0.1700

$r_0 = \infty$
$d_0 = 1.8950$
$r_1 = -3.3829$
$d_1 = 4.6183$   $n_1 = 1.78470$   $\nu_1 = 26.22$
$r_2 = 62.0406$
$d_2 = 2.3200$   $n_2 = 1.81600$   $\nu_2 = 46.62$
$r_3 = -5.8202$
$d_3 = 0.1000$
$r_4 = 9.3436$
$d_4 = 1.0200$   $n_3 = 1.78470$   $\nu_3 = 26.22$
$r_5 = 7.6574$
$d_5 = 3.2000$   $n_4 = 1.49700$   $\nu_4 = 81.61$
$r_6 = -99.7867$ (aspherical surface)
$d_6 = 20.5708$
$r_7 = -46.9324$
$d_7 = 1.3100$   $n_5 = 1.81600$   $\nu_5 = 46.62$
$r_8 = 11.7704$
$d_8 = 2.7000$   $n_6 = 1.58313$   $\nu_6 = 59.36$
$r_9 = -14.7538$ aspherical surface coefficients
B = 0   C = $0.30437 \times 10^{-3}$
D = $0.15628 \times 10^{-5}$   E = $-0.12259 \times 10^{-7}$
F = $0.69258 \times 10^{-9}$ $\left|\dfrac{\Delta x}{y_A}\right| = 0.016$   $\left|\dfrac{r_1}{D_1}\right| = 1.79$ $\dfrac{D_2}{f} = 0.81$   $\nu_{1p} - \nu_{1n} = 55.39$ $\nu_{2p} - \nu_{2n} = 12.74$

Embodiment 4 f = 8.374   NA = 0.4600
image height 10.5   t = 0.1700

$r_0 = \infty$
$d_0 = 1.8950$
$r_1 = -3.9653$ (aspherical surface)
$d_1 = 4.8975$   $n_1 = 1.76180$   $\nu_1 = 27.11$
$r_2 = \infty$
$d_2 = 2.3200$   $n_2 = 1.88300$   $\nu_2 = 40.78$
$r_3 = -5.8065$
$d_3 = 0.1000$
$r_4 = -137.6139$
$d_4 = 1.0200$   $n_3 = 1.74000$   $\nu_3 = 31.70$
$r_5 = 9.7602$
$d_5 = 3.2000$   $n_4 = 1.61800$   $\nu_4 = 63.38$
$r_6 = -12.8008$
$d_6 = 20.7150$
$r_7 = -147.5105$
$d_7 = 1.3100$   $n_5 = 1.74400$   $\nu_5 = 44.73$
$r_8 = 14.6711$
$d_8 = 2.7000$   $n_6 = 1.61800$   $\nu_6 = 63.38$
$r_9 = -40.9569$ (aspherical surface)

aspherical surface coefficients
1st surface
B = 0   C = $-0.12599 \times 10^{-1}$
D = $-0.33382 \times 10^{-2}$
E = $0.81978 \times 10^{-3}$   F = $-0.86799 \times 10^{-3}$
9th surface
B = 0   C = $0.25105 \times 10^{-4}$
D = $-0.24301 \times 10^{-6}$   E = $0.88068 \times 10^{-8}$
F = $0.98158 \times 10^{-10}$ $\left|\dfrac{\Delta x}{y_A}\right| = 0.032$ (1st surface)   $\left|\dfrac{\Delta x}{y_A}\right| = 0.0011$ (9th surface)

$\left|\dfrac{r_1}{D_1}\right| = 2.09$   $\dfrac{D_2}{f} = 0.86$ $\nu_{1p} - \nu_{1n} = 31.68$   $\nu_{2p} - \nu_{2n} = 18.65$

Embodiment 5 f = 1.857   NA = 0.900
image height 10.5   t = 0.17

$r_0 = \infty$
$d_0 = 0.1644$
$r_1 = -1.3109$
$d_1 = 1.0900$   $n_1 = 1.88300$   $\nu_1 = 40.78$
$r_2 = -1.1350$
$d_2 = 0.2890$
$r_3 = -4.1829$
$d_3 = 1.2400$   $n_2 = 1.88300$   $\nu_2 = 40.78$
$r_4 = -2.4527$
$d_4 = 0.1100$
$r_5 = -12.6370$
$d_5 = 0.4800$   $n_3 = 1.74000$   $\nu_3 = 28.29$
$r_6 = 2.5034$
$d_6 = 3.3100$   $n_4 = 1.45600$   $\nu_4 = 90.31$
$r_7 = -2.5871$ (aspherical surface)
$d_7 = 1.5989$
$r_8 = 5.5745$ (aspherical surface)
$d_8 = 2.7769$   $n_5 = 1.50137$   $\nu_5 = 56.40$
$r_9 = -5.7858$
$d_9 = 0.8200$   $n_6 = 1.77250$   $\nu_6 = 49.66$
$r_{10} = 8.5511$ (aspherical surface)

aspherical surface coefficients
(7th surface)
B = 0   C = $0.12970 \times 10^{-1}$   D = $-0.94362 \times 10^{-3}$
E = $0.30162 \times 10^{-4}$   F = $0.12043 \times 10^{-4}$
(8th surface)
B = 0   C = $0.16471 \times 10^{-1}$   D = $-0.17368 \times 10^{-2}$
E = $0.17202 \times 10^{-3}$   F = $-0.29363 \times 10^{-5}$
(10th surface)
B = 0   C = $0.99651 \times 10^{-2}$   D = $0.12868 \times 10^{-2}$
E = $-0.37135 \times 10^{-3}$   F = $0.95746 \times 10^{-4}$ $\left|\dfrac{\Delta x}{y_A}\right| = 0.13$ (7th surface)   $\left|\dfrac{\Delta x}{y_A}\right| = 0.056$ (10th surface)

$\left|\dfrac{\Delta x}{y_A}\right| = 0.16$ (8th surface)

$r_n/f = 4.6$   $r_p/f = 3.0$   $\nu_p - \nu_n = 61.71$

Embodiment 6 f = 8.158   NA = 0.4600
image height 10.5   t = 0.17

$r_0 = \infty$
$d_0 = 1.8950$
$r_1 = -4.9786$
$d_1 = 5.1732$   $n_1 = 1.78470$   $\nu_1 = 26.22$
$r_2 = -89.5093$
$d_2 = 2.3200$   $n_2 = 1.81600$   $\nu_2 = 46.62$
$r_3 = -8.0421$
$d_3 = 0.1000$ -continued $r_4 = 27.8541$
$d_4 = 1.0200$    $n_3 = 1.74000$    $\nu_3 = 31.70$
$r_5 = 12.2735$
$d_5 = 3.2000$    $n_4 = 1.56873$    $\nu_4 = 63.16$
$r_6 = -13.5923$
$d_6 = 15.4091$
$r_7 = 7.7746$ (aspherical surface)
$d_7 = 2.7000$    $n_5 = 1.77250$    $\nu_5 = 49.66$
$r_8 = -25.4687$
$d_8 = 1.3100$    $n_6 = 1.65128$    $\nu_6 = 38.25$
$r_9 = 5.7811$ (aspherical surface)
aspherical surface coefficients
(7th surface)
$B = 0$    $C = -0.47626 \times 10^{-5}$    $D = -0.51012 \times 10^{-5}$
$E = 0.11010 \times 10^{-6}$    $F = -0.23598 \times 10^{-8}$
(9th surface)
$B = 0$    $C = 0.28884 \times 10^{-3}$    $D = -0.20573 \times 10^{-4}$
$E = 0.12161 \times 10^{-5}$    $F = -0.34861 \times 10^{-7}$ $\left|\frac{\Delta x}{y_A}\right| = 0.01$ (7th surface)    $\left|\frac{\Delta x}{y_A}\right| = 0.007$ (9th surface)

$\frac{r_n}{f} = 0.71$    $\frac{r_p}{f} = 0.95$    $\nu_p - \nu_n = 31.46$

Embodiment 7

$f = 1.922$    $NA = 1.234$
image height 10.5    $t = 0.17$
$r_0 = \infty$
$d_0 = 0.1755$
$r_1 = \infty$
$d_1 = 1.0578$    $n_1 = 1.51633$    $\nu_1 = 64.15$
$r_2 = -0.8702$
$d_2 = 0.0800$
$r_3 = 10.2978$
$d_3 = 1.5300$    $n_2 = 1.64250$    $\nu_2 = 58.37$
$r_4 = -2.7050$ (aspherical surface)
$d_4 = 2.3251$
$r_5 = -347.1101$
$d_5 = 1.4100$    $n_3 = 1.74000$    $\nu_3 = 31.70$
$r_6 = 3.0602$ (aspherical surface)
$d_6 = 2.1500$    $n_4 = 1.49700$    $\nu_4 = 81.61$
$r_7 = -4.3220$
aspherical surface coefficients
(4th surface)
$B = 0$    $C = 0.53103 \times 10^{-2}$
$D = 0.14400 \times 10^{-2}$    $E = -0.26935 \times 10^{-3}$
$F = 0.44110 \times 10^{-4}$
(6th surface)
$B = 0$    $C = -0.40712 \times 10^{-2}$
$D = -0.76758 \times 10^{-3}$    $E = 0.16146 \times 10^{-3}$
$F = -0.17238 \times 10^{-4}$
$|\Delta x/y_A| = 0.051$ (4th surface)    $|\Delta/y_A| = 0.06$ (6th surface)
$|(I_s + I_{os})/2NA'| = 1.78$ (4th surface)
$|(I_s + I_{os})/2NA'| = 1.04$ (6th surface)
$f_1 = 1.361$    $f_1/f = 0.71$
$\nu_{2p} - \nu_{2n} = \nu_4 - \nu_3 = 49.91$    $n_{2n} - n_{2p} = n_3 - n_4 = 0.243$
$r_p/f = r_7/f = -2.25$ Embodiment 8

$f = 1.907$    $NA = 1.234$
image height 10.5    $t = 0.17$
$r_0 = \infty$
$d_0 = 0.2326$
$r_1 = \infty$
$d_1 = 1.2759$    $n_1 = 1.51633$    $\nu_1 = 64.15$
$r_2 = -1.0496$
$d_2 = 0.0800$
$r_3 = 5.0042$
$d_3 = 1.5300$    $n_2 = 1.64250$    $\nu_2 = 58.37$
$r_4 = -2.7576$ (aspherical surface)
$d_4 = 0.5778$
$r_5 = -6.3479$
$d_5 = 1.4100$    $n_3 = 1.74000$    $\nu_3 = 31.70$
$r_6 = 3.7352$
$d_6 = 2.1500$    $n_4 = 1.49700$    $\nu_4 = 81.61$
$r_7 = -3.7260$ (aspherical surface)
aspherical surface coefficients
(4th surface)
$B = 0$    $C = 0.95618 \times 10^{-2}$
$D = 0.14577 \times 10^{-2}$    $E = -0.19322 \times 10^{-3}$
$F = 0.26279 \times 10^{-4}$
(7th surface)
$B = 0$    $C = 0.15859 \times 10^{-3}$ -continued $D = -0.44997 \times 10^{-5}$
$E = -0.27856 \times 10^{-5}$    $F = 0.52578 \times 10^{-5}$
$|\Delta x/y_A| = 0.15$ (4th surface)    $|\Delta x/y_A| = 0.011$ (7th surface)
$|(I_s + I_{os})/2NA'| = 2.73$ (4th surface)
$|(I_s + I_{os})/2NA'| = 1.66$ (7th surface)
$f_1 = 1.417$    $f_1/f = 0.74$
$\nu_{2p} - \nu_{2n} = \nu_4 - \nu_3 = 49.91$    $n_{2n} - n_{2p} = n_3 - n_4 = 0.243$
$r_p/f = r_7/f = -1.95$ Embodiment 9

$f = 4.684$    $NA = 0.65$
image height 10.5    $t = 0.17$
$r_0 = \infty$
$d_0 = 0.7009$
$r_1 = -34.8132$
$d_1 = 2.8388$    $n_1 = 1.75500$    $\nu_1 = 52.33$
$r_2 = -2.4784$ (aspherical surface)
$d_2 = 3.6132$
$r_3 = 46.7343$
$d_3 = 0.9000$    $n_2 = 1.84666$    $\nu_2 = 23.78$
$r_4 = 3.7621$ (aspherical surface)
$d_4 = 3.8645$    $n_3 = 1.60323$    $\nu_3 = 42.32$
$r_5 = -6.0036$
aspherical surface coefficients
(2nd surface)
$B = 0$    $C = 0.35111 \times 10^{-2}$
$D = -0.60909 \times 10^{-3}$
$E = 0.64876 \times 10^{-3}$    $F = -0.83669 \times 10^{-4}$
(4th surface)
$B = 0$    $C = -0.31647 \times 10^{-2}$
$D = 0.38485 \times 10^{-4}$    $E = -0.30599 \times 10^{-4}$
$F = 0.16115 \times 10^{-5}$
$|\Delta x/y_A| = 0.02$ (2nd surface)    $|\Delta x/y_A| = 0.06$ (4th surface)
$|(I_s + I_{os})/2NA'| = 0.51$ (2nd surface)
$|(I_s + I_{os})/2NA'| = 0.82$ (4th surface)
$f_1 = 3.406$    $f_1/f = 0.73$
$\nu_{2p} - \nu_{2n} = \nu_3 - \nu_2 = 18.54$    $n_{2n} - n_{2p} = n_2 - n_3 = 0.243$
$r_p/f = r_5/f = -1.28$ Embodiment 10

$f = 4.597$    $NA = 0.65$
image height 10.5    $t = 0.1701$
$r_0 = \infty$
$d_0 = 0.7022$
$r_1 = 59.7239$
$d_1 = 4.0289$    $n_1 = 1.75500$    $\nu_1 = 52.33$
$r_2 = -3.5548$ (aspherical surface)
$d_2 = 2.2139$
$r_3 = 14.6434$
$d_3 = 0.9000$    $n_2 = 1.84666$    $\nu_2 = 23.78$
$r_4 = 6.6292$
$d_4 = 3.0000$    $n_3 = 1.45600$    $\nu_3 = 90.31$
$r_5 = -5.7008$ (aspherical surface)
aspherical surface coefficients
(2nd surface)
$B = 0$    $C = 0.15604 \times 10^{-2}$
$D = -0.94403 \times 10^{-3}$    $E = 0.31243 \times 10^{-3}$
$F = -0.28655 \times 10^{-4}$
(5th surface)
$B = 0$    $C = -0.56297 \times 10^{-4}$
$D = 0.15957 \times 10^{-3}$
$E = -0.21248 \times 10^{-4}$    $F = 0.93051 \times 10^{-6}$
$|\Delta x/y_A| = 0.01$ (2nd surface)    $|\Delta x/y_A| = 0.009$ (5th surface)
$|(I_s + I_{os})/2NA'| = 0.61$ (2nd surface)
$|(I_s + I_{os})/2NA'| = 0.17$ (5th surface)
$f_1 = 4.569$    $f_1/f = 0.99$
$\nu_{2p} - \nu_{2n} = \nu_3 - \nu_2 = 66.53$    $n_{2n} - n_{2p} = n_2 - n_3 = 0.39$
$r_p/f = r_5/f = -1.24$ wherein the reference symbols $r_1, r_2, \ldots$ represent radii of curvature on the surface of the respective lens elements, the reference symbols $d_1, d_2, \ldots$ designate the thicknesses of the respective lens elements and the airspaces reserved therebetween, the reference symbols $n_1, n_2, \ldots$ denotes refractive indices of the respective lens elements, the reference symbols $\nu_1, \nu_2, \ldots$ represent Abbe's numbers of the respective lens elements, the reference symbol $t$ designates thickness of the cover glass, the reference symbol $r_0$ denotes the surface of the cover glass located on the side of the lens system, and the reference symbol $d_o$ represents the airspace reserved between the cover glass and the first surface of the lens system.

The Embodiment 1 has the composition illustrated in FIG. 1 wherein the third surface ($r_3$) is designed as an aspherical surface.

Figure 2:
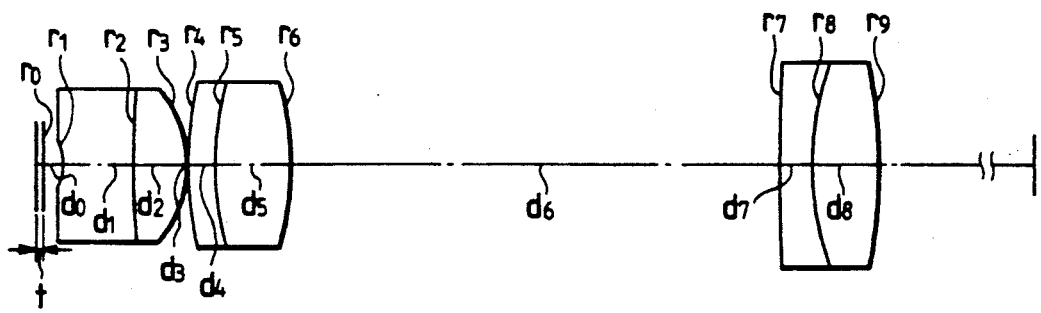

The Embodiment 2 has the composition illustrated in FIG. 2 wherein the first surface ($r_1$) is designed as an aspherical surface.

Figure 3:
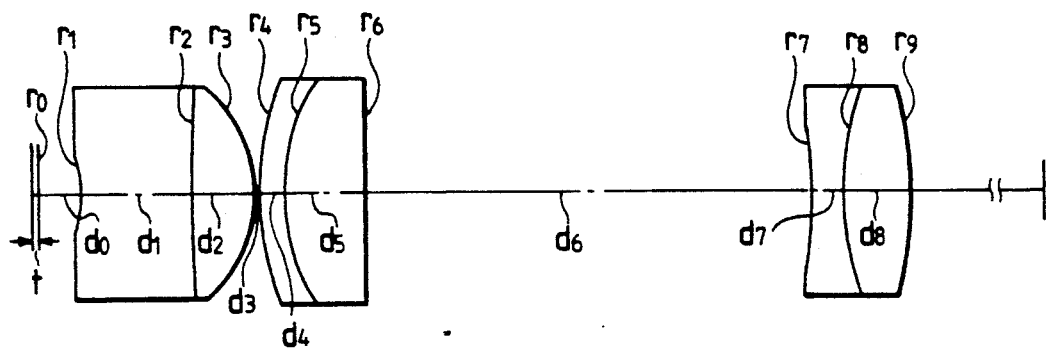

The Embodiment 3 has the composition illustrated in FIG. 3 wherein the sixth surface ($r_6$) is designed as an aspherical surface.

Figure 4:
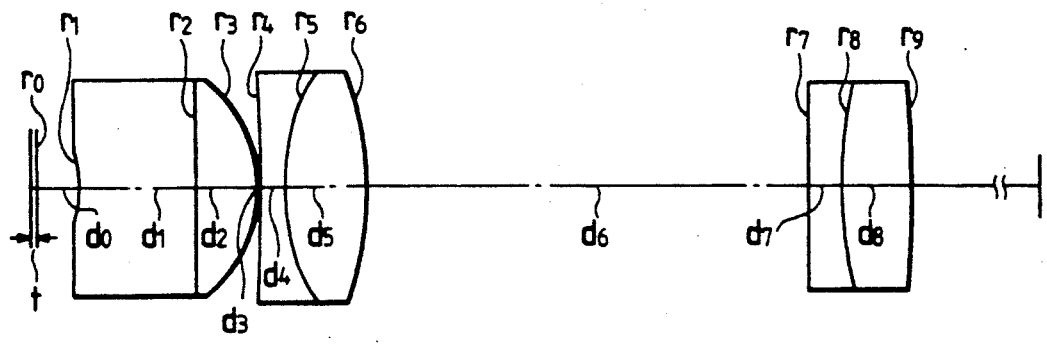

The Embodiment 4 has the composition illustrated in FIG. 4, wherein the first surface ($r_1$) and the final surface ($r_9$) are designed as aspherical surfaces.

In each of the Embodiments 1 through 4, a positive cemented doublet is arranged on the extremely image side.

Figure 5:
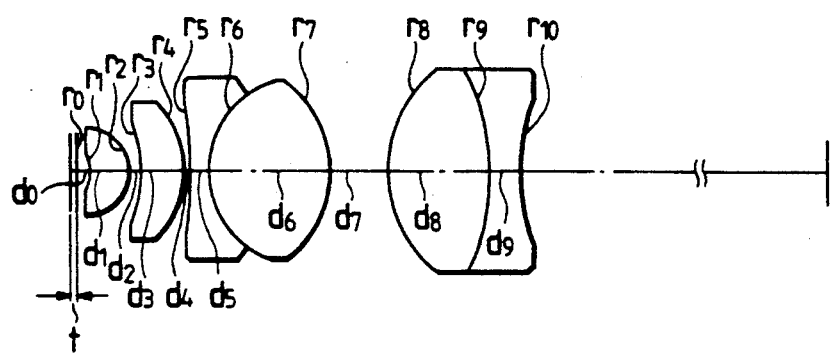

The Embodiment 5 has the composition shown in FIG. 5 wherein the seventh surface ($r_7$), the eighth surface ($r_8$) and the tenth surface ($r_{10}$) are designed as aspherical surfaces.

Figure 6:
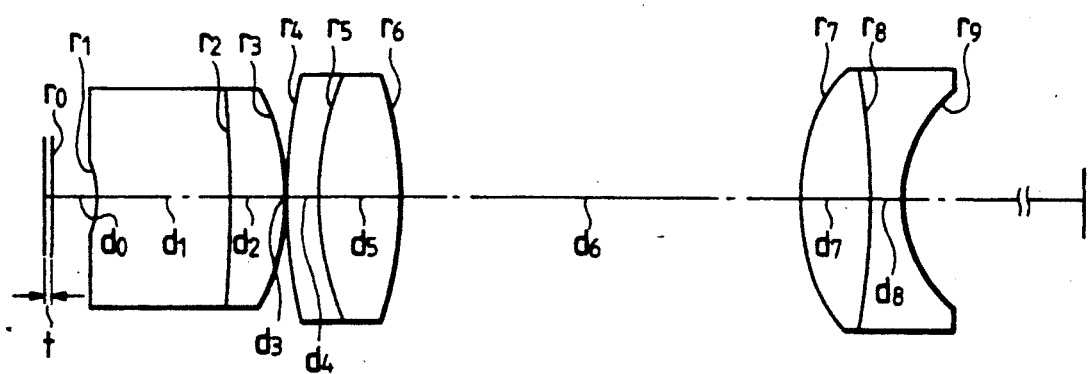

The Embodiment 6 has the composition shown in FIG. 6 wherein aspherical surfaces are used as the seven-the surface ($r_7$) and the nineth surface ($r_9$).

In both of the Embodiments 5 and 6, a meniscus cemented doublet having a concave surface on the image side is arranged on the extremely image side.

Figure 7:
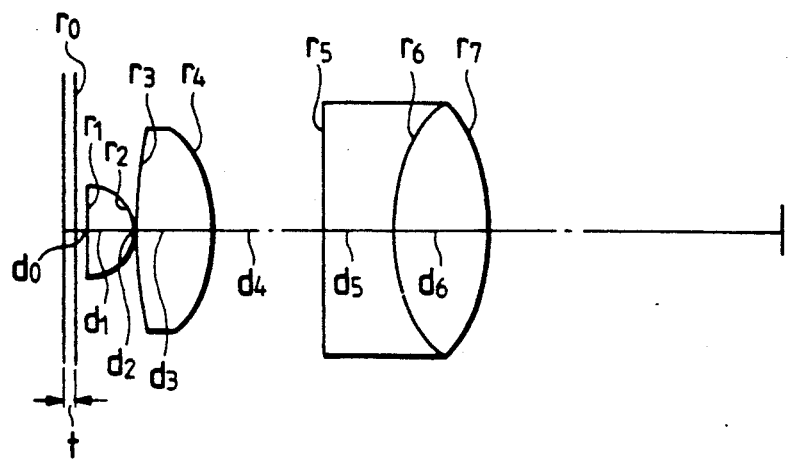

The Embodiment 7 has the composition shown in FIG. 7 wherein aspherical surfaces are used as the fourth surface ($r_4$) and the sixth surface ($r_6$).

Figure 8:
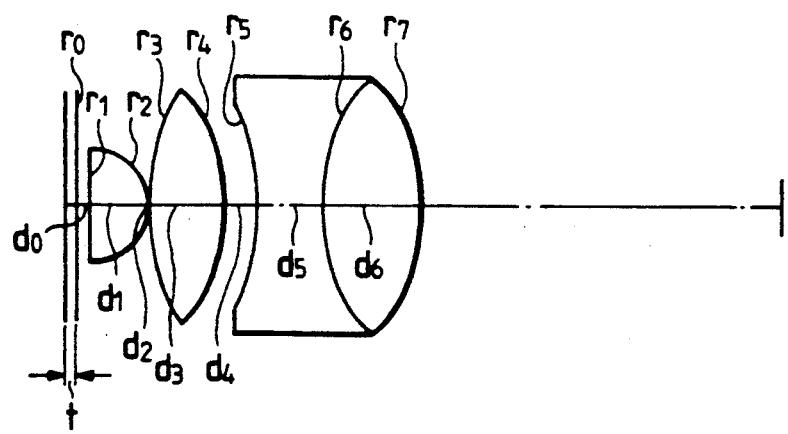

The Embodiment 8 has the composition illustrated in FIG. 8 wherein aspherical surfaces are used as the fourth surface ($r_4$) and the seventh surface ($r_7$).

Figure 9:
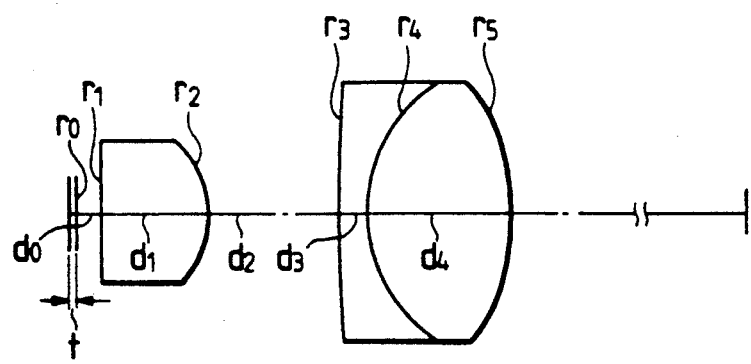
Figure 10:
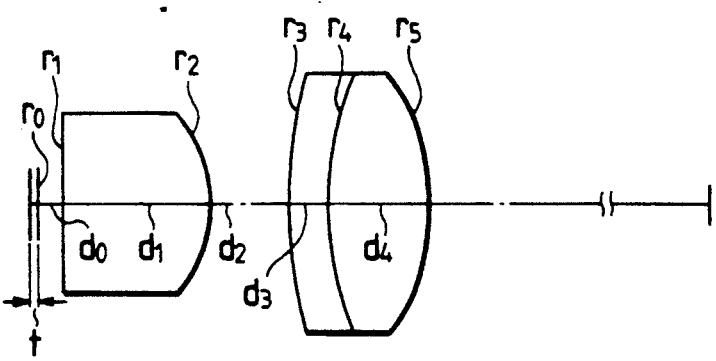
Figure 11:
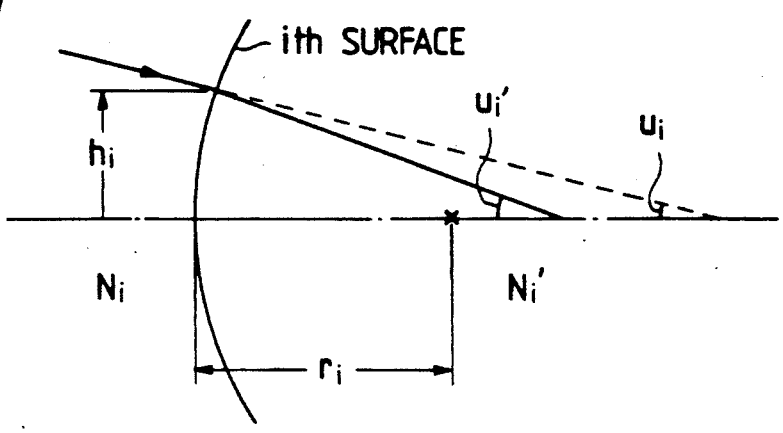
FIG. 11 shows a diagram descriptive of the spherical aberration coefficients.
Figure 14:
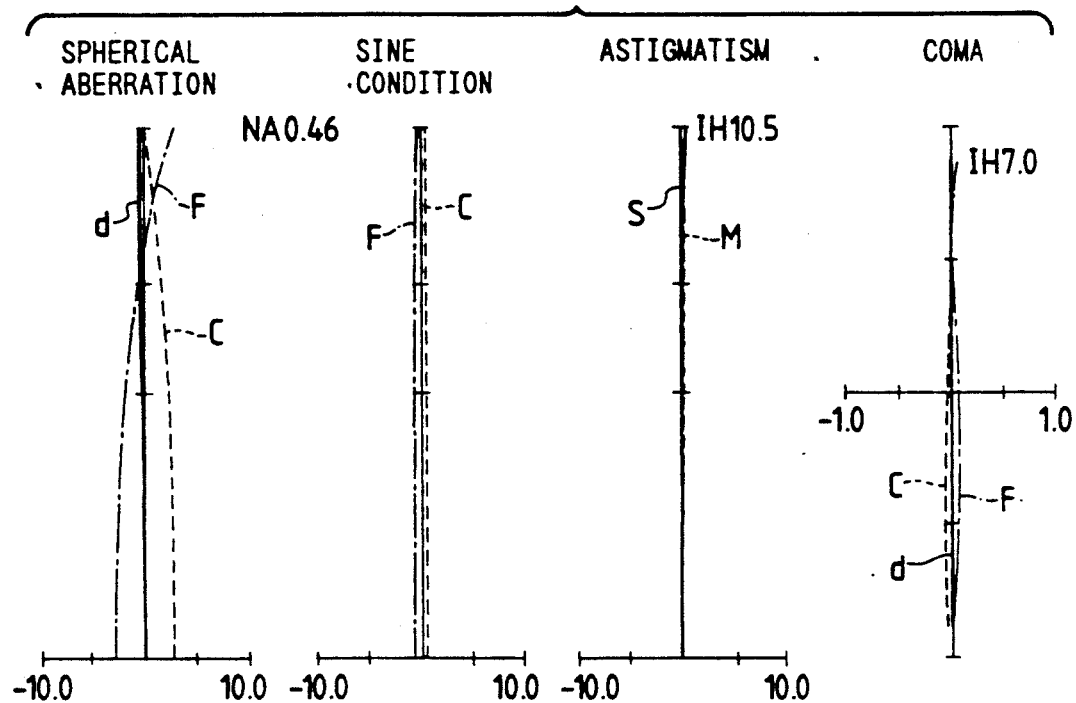
Figure 15:
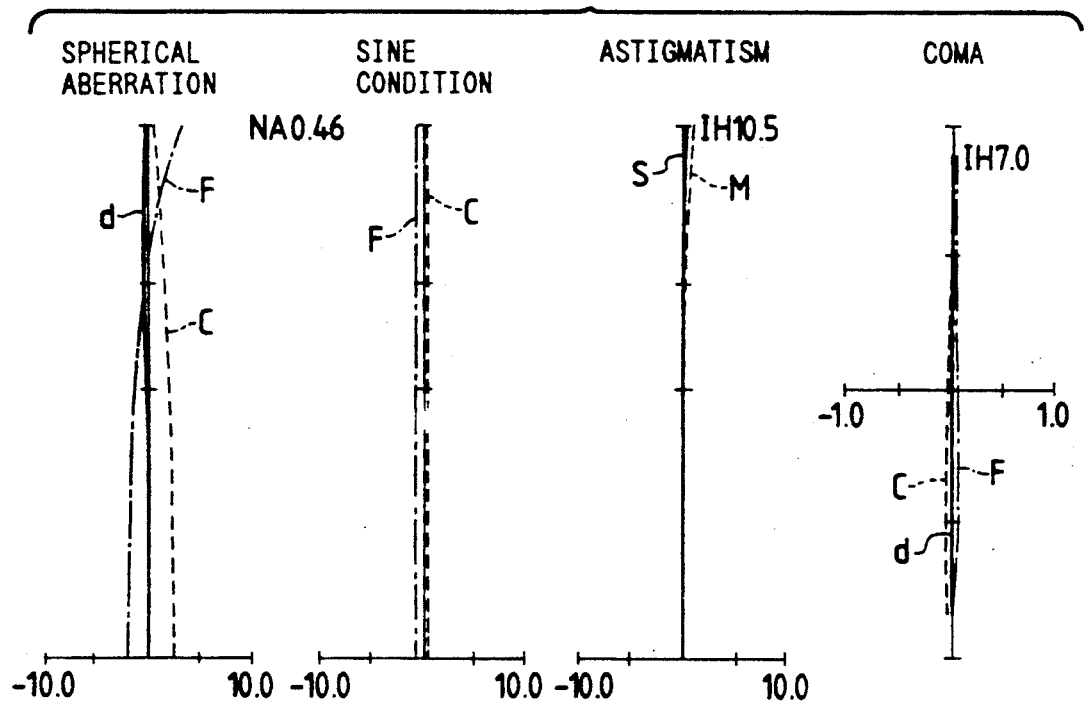
Figure 16:
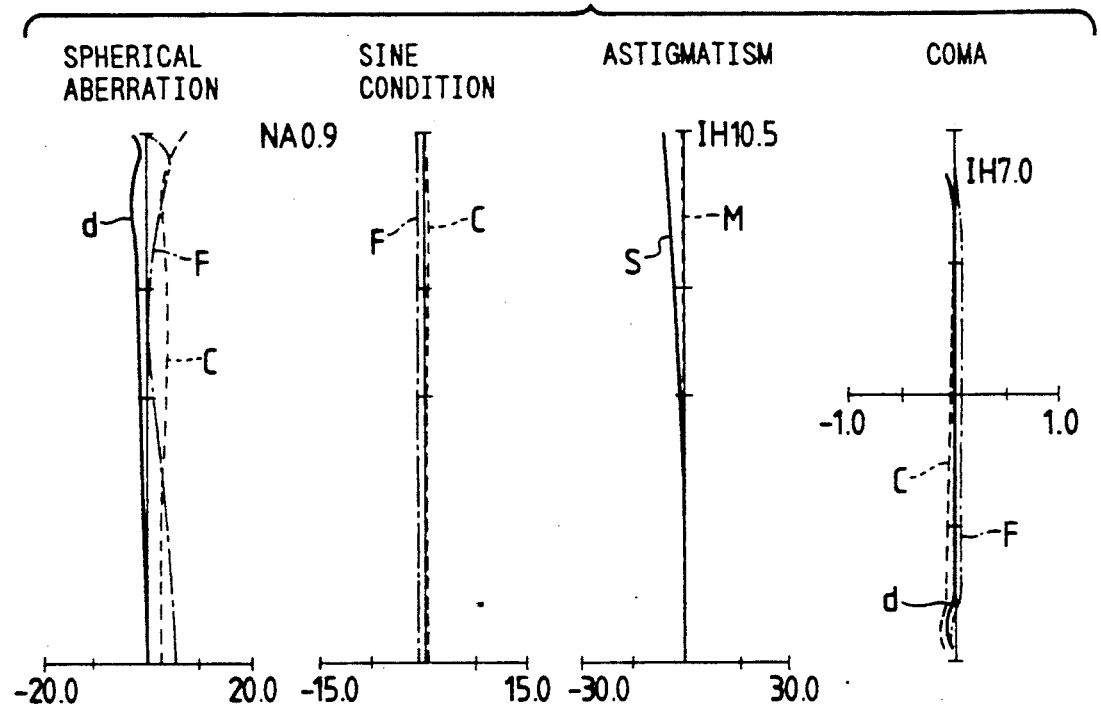
Figure 17:
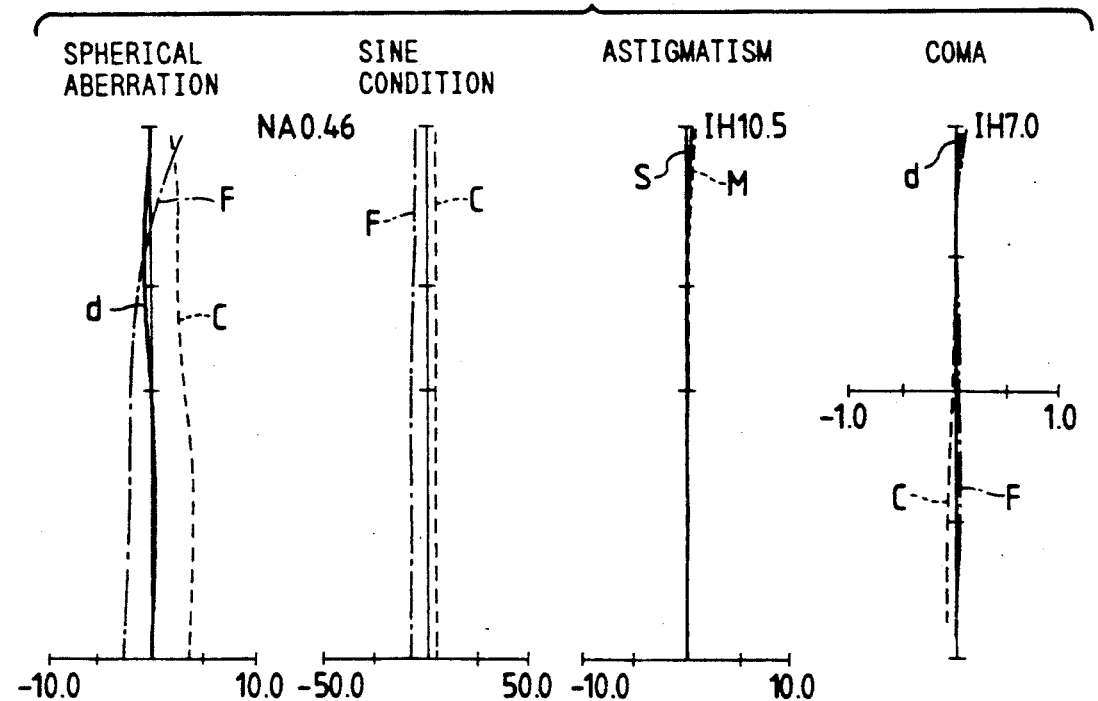
Figure 18:
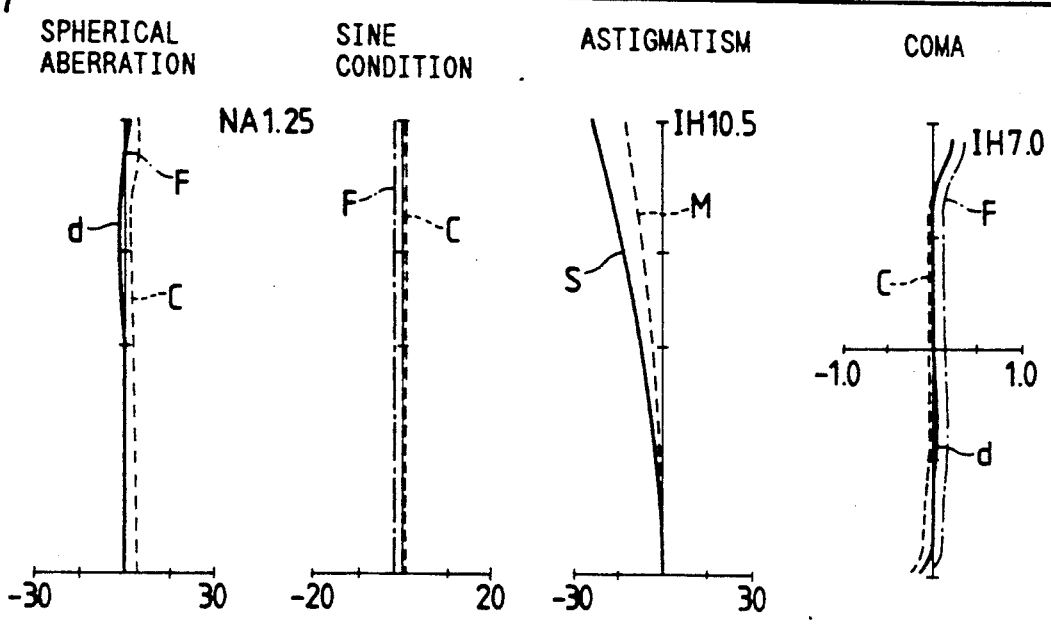
Figure 19:
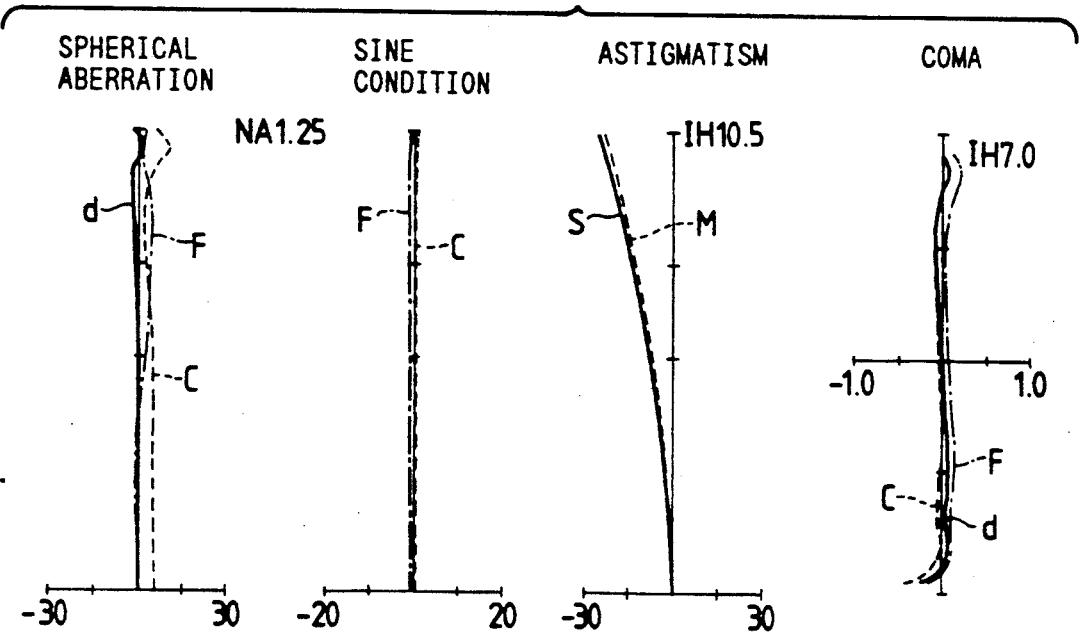
Figure 20:
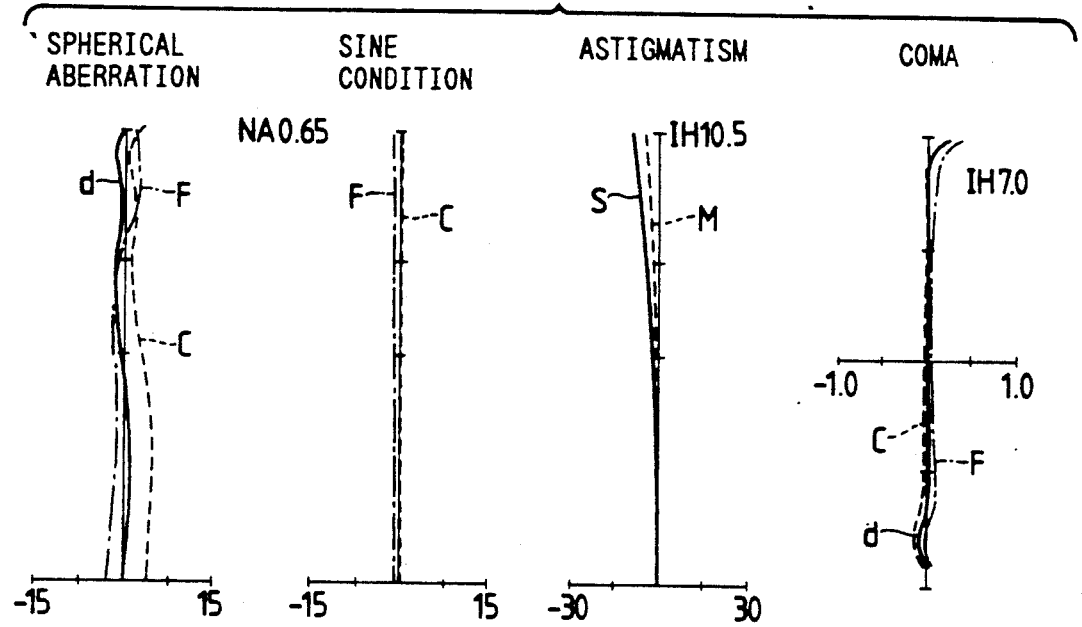
Figure 21:
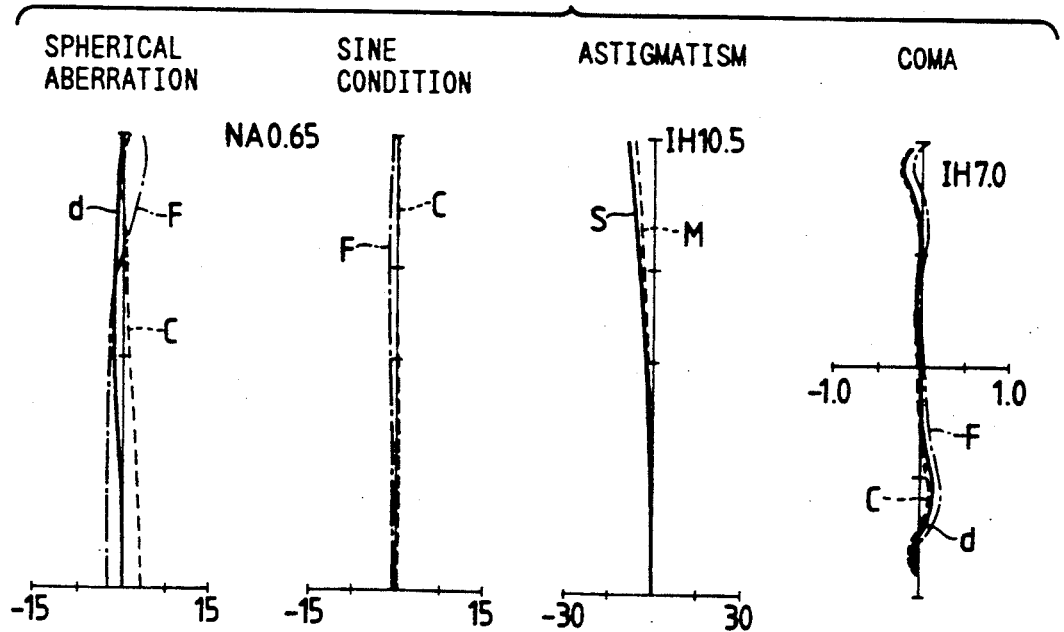

The Embodiments 9 and 10 has the compositions illustrated in FIG. 9 and FIG. 10 respectively in both of which the second surface ($r_2$) and the fifth surface ($r_5$) are designed as aspherical surfaces.

Each of the Embodiments 7 through 10 consists of a lens component which is arranged on the extremely object side and comprises a positive lens element having a convex surface on the image side, and another lens component which is designed as a cemented doublet, and comprises aspherical surfaces on both the lens components.

As is understood from the foregoing description, the objective lens system for microscopes according to the present invention has a simple composition, consists of a small number of lens elements and, nevertheless, has aberrations such as spherical aberration, sine condition and curvature of field corrected sufficiently favorably by using the aspherical surfaces having adequate shapes.

I claim:

1. An objective lens system for microscopes comprising:

a plural number of lens components including a cemented doublet, wherein one of said lens components is disposed on the most object side and has a convex surface on the image side, and wherein at least one surface of the lens components is an aspherical surface that is convex toward the image side and has such a shape as to weaken the refractive power thereof as the portions of said aspherical surface are farther from the optical axis.

2. An objective lens system from microscopes, comprising:

a plural number of lens components including a cemented doublet, wherein one of said lens components is disposed on the most object side and has a convex surface on the image side thereof, wherein one of said objective lens system's lens surfaces is an aspherical surface that is concave toward the object side and has a shape so as to strengthen the refractive power thereof as portions of said aspherical surface are farther from the optical axis, and wherein a reference sphere of said aspherical surface has negative refractive power.

3. An objective lens system for microscopes comprising:

a plurality of lens components including a cemented doublet;

wherein one of said lens components is on the most object side and has a convex surface of the image side; and wherein one of said lens components has a surface that is an aspherical surface convex toward the object side and has such a shape as to weaken the refractive power thereof as portions of said aspherical surface are farther from the optical axis.

4. An objective lens system for microscopes comprising:

a plurality of lens components including a cemented doublet;

wherein one of said lens components is on the most object side and has a convex surface on the image side;

wherein one of said lens components has a surface that is an aspherical surface concave toward the image side and has such a shape as to strengthen the refractive power thereof as portions of said aspherical surface are farther from the optical axis; and wherein a reference sphere of said aspherical surface has negative refractive power.

5. An objective lens system for microscopes according to claim 1, 2, 3 or 4 wherein said lens component on the object side has an aspherical surface and said aspherical surface is so designed as to satisfy the following condition (1):

$$0.0005 < |\Delta x / y_A| < 0.08 \tag{1}$$

wherein the reference symbol $y_A$ represents the maximum height of rays on said aspherical surface and the reference symbol $\Delta x$ designates a deviation in the direction along the optical axis and the maximum height of ray on said aspherical surface between said aspherical surface and the spherical surface having the same curvature as that at the vertex of said aspherical surface.

6. An objective lens system for microscopes according to claim 5, wherein the lens component disposed on the most object side has a meniscus lens component satisfying the following conditions (2) and (3):

$$0.2 < |r_1/D_1| < 6.0 \tag{2}$$

$$D_2/f > 0.1 \tag{3}$$

wherein the reference symbol $r_1$ represents a radius of curvature on the most object side surface of the meniscus lens component, the reference symbol $D_1$ designates distance as measured from an object to the object side surface of said meniscus lens component, the reference symbol $D_2$ denotes thickness of said meniscus lens component and the reference symbol f represents focal length of the objective lens system as a whole.

7. An objective lens system for microscopes according to claim 6, wherein said lens components arranged on the object side is a cemented doublet.

8. An objective lens system for microscopes according to claim 5 wherein one of the lens components is disposed on the image side and is a cemented doublet consisting of a positive lens element and a negative lens element, and is so designed as to satisfy the following condition (4):

$$\nu_{2p} - \nu_{2n} > 10 \tag{4}$$

wherein the reference symbols $\nu_{2p}$ and $\nu_{2n}$ represent Abbe's numbers of the positive lens element and the negative lens element respectively of said lens component on the image side.

9. An objective lens system for microscopes according to claim 1, 3, 3 or 4, wherein the lens component disposed on the most object side is a meniscus lens component satisfying the following conditions (2) and (3):

$$0.2 < |r_1/D_1| < 6.0 \tag{2}$$

$$D_2/f > 0.1 \tag{3}$$

wherein the reference symbol $r_1$ represents a radius of curvature on the most object side surface of the meniscus lens component, the reference symbol $D_1$ designates distance as measured from an object to the object side surface of said meniscus lens component, the reference symbol $D_2$ denotes thickness of said meniscus lens component and the reference symbol f represents focal length of the objective lens system as a whole.

10. An objective lens system for microscopes according to claim 9 wherein one of the lens components is disposed on the image side and is a cemented doublet consisting of a positive lens element and a negative lens element, and is satisfying the following condition (4):

$$\nu_{2p} - \nu_{2n} > 10 \tag{4}$$

wherein the reference symbol $\nu_{2p}$ and $\nu_{2n}$ represent Abbe's numbers of the positive lens element and the negative lens element respectively of said lens component arranged on the extremely image side.

11. An objective lens system for microscopes according to claim 10 wherein one of the lens components is disposed on the image side and is a cemented doublet consisting of a positive lens element and a negative lens element, and satisfying the following condition (4):

$$\nu_{2p} - \nu_{2n} > 10 \tag{4}$$

wherein the reference symbols $\nu_{2p}$ and $\nu_{2n}$ represent Abbe's numbers of the positive lens element and the negative lens element respectively of said lens component arranged on the extremely image side.

12. An objective lens system for microscopes according to claim 1, 2, 3 or 4 wherein one of the lens components is disposed on the most image side and has a meniscus shape lens component concave toward the image side, said objective lens system comprises at least two aspherical surfaces, each of which satisfies the following condition (1'):

$$0.003 < |\Delta x/y_A| < 0.3 \tag{1'}$$

wherein the reference symbol $y_A$ represents a maximum height of a ray on said aspherical surface and the reference symbol $\Delta x$ designates deviation in the direction along the optical axis and at the maximum height of ray on said aspherical surface between said aspherical surface and a spherical surface having the same curvature as that at the vertex of the spherical surface on contact with said aspherical surface.

13. An objective lens system for microscopes according to claim 12 satisfying the following conditions (5) and (6):

$$0.2 < r_n/f < 8 \tag{5}$$

$$0.2 < r_p/f < 8 \tag{6}$$

wherein the reference symbols $r_p$ and $r_n$ represent radii of curvature on the object side surface and the image side surface respectively of the lens component arranged on the extremely image side, and the reference symbol f designates focal length of said objective lens system as a whole.

14. An objective lens system for microscopes according to claim 12 or 13 comprising, between the lens component extremely on the extremely object side and the lens component extremely on the extremely image side, a cemented lens component consisting of a positive lens element and a negative lens element and satisfying the following condition (7)

$$\nu_p - \nu_n > 10 \tag{7}$$

wherein the reference symbols $\nu_p$ and $\nu_n$ represent Abbe's numbers of the positive lens element and the negative lens element respectively of said cemented lens component.

15. An objective lens system for microscopes according to claim 13 comprising, between the lens component on the object side and the lens component on the image side, a cemented lens component consisting of a positive lens element and a negative lens element, and satisfying the following condition (7)

$$\nu_p - \nu_n > 10 \tag{7}$$

wherein the reference symbols $\nu_p$ and $\nu_n$ represent Abbe's numbers of the positive lens element and the negative lens element respectively of said cemented lens component.

16. An objective lens system for microscopes according to claim 1, 2, 3 or 4 having a least two aspherical surfaces.

17. An objective lens system for microscopes according to claim 16 wherein said aspherical surfaces satisfy the following condition (1'):

$$0.003 < |\Delta x/y_A| < 0.3 \tag{1'}$$

wherein the reference symbol $\Delta x$ represents a deviation in the direction along the optical axis and at the maximum height of rays on each of said aspherical surfaces between said aspherical surface and the spherical surface having the same curvature as that at the vertex of a spherical surface in contact with said aspherical surface and the reference symbol $y_A$ designates the maximum height of ray on said aspherical surface.

18. An objective lens system for microscopes according to claim 9 wherein each of said aspherical surfaces and the two surface before and after said aspherical surface have spherical aberration coefficients satisfying the following condition (8):

$$|(I_s + I_{os})/2NA'| < 4 \tag{8}$$

wherein the reference symbol $I_s$ represents a total sum of third order spherical aberration coefficients of the reference sphere of the aspherical surface and the two surfaces before and after said the aspherical surface, the reference symbol $I_{os}$ designates the spherical aberration coefficient of the third order of the portions of said aspherical surface deviated from the spherical surface, and the reference symbol NA' denotes numerical aperture on the image side.

19. An objective lens system for microscopes according to claim 16, 17 or 18 satisfying the following condition (9):

$$0.3 < f_1/f < 1.5 \tag{9}$$

wherein the reference symbol f represents focal length of said objective lens system as a whole and the reference symbol $f_1$ designates focal length of the lens component arranged on the object side.

20. An objective lens system for microscopes according to claim 19 satisfying the following conditions (10), (11) and (12):

$$\nu_{2p} - \nu_{2n} > 10 \tag{10}$$

$$n_{2n} - n_{2p} > 0.05 \tag{11}$$

$$0.7 < -\frac{r_p}{f} < 4 \tag{12}$$

wherein the reference symbols $\nu_{2p}$ and $\nu_{2n}$ represent Abbe's numbers of the positive lens element and the negative lens element respectively of said cemented doublet, the reference symbols $n_p$ and $n_n$ designate refractive indices of said positive lens element and said negative lens element respectively, and the reference symbol $r_p$ denotes radius of curvature on the air contacted surface of the positive lens element of said cemented doublet.

21. An objective lens system for microscopes according to claim 17, satisfying the following condition (9):

$$0.3 < f_1/f < 1.5 \tag{9}$$

wherein the reference symbol f represents focal length of said objective lens system as a whole and the reference symbol $f_1$ designates focal length of the lens component arranged on the objective side.

22. An objective lens system for microscopes according to claim 21 satisfying the following conditions (10), (11) and (12):

$$\nu_{2p} - \nu_{2n} > 10 \tag{10}$$

$$n_{2n} - n_{2p} > 0.05 \tag{11}$$

$$0.7 < -\frac{r_p}{f} < 4 \tag{12}$$

wherein the reference symbols $\nu_{2p}$ and $\nu_{2n}$ represent Abbe's numbers of the positive lens element and the negative lens element respectively of said cemented doublet, the reference symbols $n_p$ and $n_n$ designate refractive indices of said positive lens element and said negative lens element respectively, and the reference symbol $r_p$ denotes radius of curvature on the air contacted surface of the positive lens element of said cemented doublet.

23. An objective lens system for microscopes according to claim 17, wherein the lens component on the object side has positive refractive power.

24. An objective lens system for microscopes according to claim 17, satisfying the following condition (9):

$$0.3 < f_1/f < 1.5 \tag{9}$$

wherein the reference symbol f represents focal length of said objective lens system as a whole and the reference symbol f1 designates focal length of the lens component arranged on the objective side.

25. An objective lens system for microscopes according to claim 24 satisfying the following conditions (10), (11) and (12):

$$\nu_{2p} - \nu_{2n} > 10 \tag{10}$$

$$n_{2n} - n_{2p} > 0.05 \tag{11}$$

$$0.7 < -\frac{r_p}{f} < 4 \tag{12}$$

wherein the reference symbols $\nu_{2p}$ and $\nu_{2n}$ represent Abbe's numbers of the positive lens element and the negative lens element respectively of said cemented doublet, the reference symbols $n_p$ and $n_n$ designate refractive indices of said positive lens element and said negative lens element respectively, and the reference symbol $r_p$ denotes radius of curvature on the air contacted surface of the positive lens element of said cemented doublet.

26. An objective lens system for microscopes according to claim 16, wherein at least one aspherical surface is arranged in each of the lens component on the object side and a lens component on the image side.

27. An objective lens system for microscopes according to claim 1, 2, 3 or 4, wherein said lens component disposed on the most object side has a plano-convex lens shape.

28. An objective lens system for microscopes according to claim 27 wherein a cemented doublet is on the image side of said lens component on the object side.

29. An objective lens system for microscopes according to claim 28, wherein a positive lens component is arranged between said lens complement on the object side and said cemented doublet.

30. An objective lens system for microscopes according to claim 1, 2, 3 or 4 wherein all of said lens components are cemented doublets.

31. An objective lens system for microscopes according to claim 1 comprising, a second aspherical surface which is convex toward the object side and has such a shape as to weaken refractive power thereof as portions of said second aspherical surface are farther from the optical axis.

32. An objective lens system for microscopes according to claim 31 comprising, a third aspherical surface which is concave toward the image side and has such a shape as to strengthen refractive power thereof as portions of said third aspherical surface are farther from the optical axis.

33. An objective lens system for microscopes according to claim 31 comprising, a third aspherical surface which is convex toward the object side and has such a shape as to weaken refractive power thereof as portions of said third aspherical surface are farther from the optical axis.

34. An objective lens system for microscopes according to claim 1 comprising, a second aspherical surface which is convex toward the image side and has such a shape as to weaken refractive power thereof as portions of said second aspherical surface are farther from the optical axis.

35. An objective lens system for microscopes comprising:
a first lens component disposed on the most object side and having a convex surface on the image side; and
a cemented doublet;
wherein said first lens components has an aspherical surface which weakens the refractive power thereof as the portions of said aspherical surface are farther from the optical axis; and
wherein a reference sphere of said aspherical surface has a positive refractive power and said aspherical surface satisfies the following condition (1):

$$0.0005 < |\Delta x/y_A| < 0.08 \quad (1)$$

wherein the reference symbol $y_A$ represents the maximum height of a ray on said aspherical surface and the reference symbol $\Delta x$ designates deviation in a direction along the optical axis and the maximum height of a ray on said aspherical surface between said aspherical surface and a spherical surface having the same curvature as that at a vertex of said aspherical surface.

36. An objective lens system for microscopes comprising:
a meniscus lens component disposed on the most object side and having a convex surface on the image side; and
a cemented doublet;
wherein at least one lens surfaces is an aspherical surface having such a shape as to weaken the refractive power thereof as the portions of said aspherical surface are farther from the optical axis; and
wherein a reference sphere of said aspherical surface has a positive refractive power and said aspherical surface satisfies the following conditions (2) and (3):

$$0.2 < |r_1/D_1| < 6.0 \quad (2)$$

$$D_2/f > 0.1 \quad (3)$$

wherein the reference symbol $r_1$ represents a radius of curvature on the most object side surface of the meniscus lens component, the reference symbol $D_1$ designates distance as measured from an object to the object side surface of said meniscus lens component, the reference symbol $D_2$ denotes thickness of said meniscus lens component and the reference symbol f represents focal length of the objective lens system as a whole.

37. An objective lens system for microscopes comprising:
a lens component disposed on the most object side having a convex surface on the image side; and
a cemented doublet;
wherein a lens components is disposed on the most image side and has a meniscus shape concave toward the image side;
wherein said objective lens system comprises at least two aspherical surfaces, at least one of which has such a shape as to weaken the refractive power thereof as portions of said aspherical surface are farther from the optical axis; and
wherein the reference sphere of said aspherical surface has a positive refractive power and said aspherical surface satisfies the following condition (1'):

$$0.003 < |\Delta x/y_A| < 0.3 \quad (1')$$

wherein the reference symbol $\Delta x$ represents a deviation in a direction along the optical axis and at the maximum height of rays on each of said aspherical surfaces between said aspherical surface and a spherical surface having the same curvature as that at a vertex of a spherical surface in contact with said aspherical surface and the reference symbol $y_A$ designates the maximum height of a ray on said aspherical surface.

38. An objective lens system for microscopes comprising:
a lens component disposed on the most object side and having a convex surface on the image side; and
a cemented doublet;
wherein said objective lens system comprises two aspherical surfaces, at least one of which has such a shape as to weaken the refractive power thereof as the portions of said aspherical surface are farther from the optical axis;
wherein the reference sphere of said at least one aspherical surface has a positive refractive power; and
wherein said objective lens system satisfies the following condition (9):

$$0.3 < f_1/f < 1.5 \quad (9)$$

wherein the reference symbol f represent focal length of said objective lens system as a whole and the reference symbol $f_1$ designates focal length of the lens component disposed on the object side.

39. An objective lens system for microscopes comprising:
a lens component disposed on the most object side and having a convex surface on the image side; and
a cemented doublet;
wherein said lens component disposed on the most object side has at least one aspherical surface; and
wherein a lens component disposed on the most image side in said objective lens system also has at least one aspherical surface; and
wherein said objective lens system comprises at least one aspherical surface having a shape as to weaken the refractive power thereof as portions of said aspherical surface are farther from the optical axis and a reference sphere of this aspherical surface has positive refractive power.

40. An objective lens system for microscopes comprising:
- a lens component disposed on the most object side having a convex surface on the image side; and
- a cemented doublet;
- wherein said lens component disposed on the most object side has an aspherical surface which has such a shape as to strengthen refractive power thereof as portions of said aspherical surface are farther from the optical axis; and
- wherein a reference sphere of said aspherical surface has a negative refractive power and said aspherical surface satisfies the following condition (1):

$$0.0005 < |\Delta x/y_A| < 0.08 \tag{1}$$

wherein the reference symbol $y_A$ represents the maximum height of a ray on said aspherical surface and the reference symbol $\Delta x$ designates deviation in a direction along the optical axis and maximum height of the ray on said aspherical surface between said aspherical surface and a spherical surface having the same curvature as a vertex of said aspherical surface.

41. An objective lens system for microscopes comprising:
- a meniscus component disposed on the most object side having a convex surface on the image side; and
- a cemented doublet;
- wherein at least one lens surface is an aspherical surface having such a shape as to strengthen refractive power thereof as portions of said aspherical surface are farther from the optical axis, and a reference sphere of said aspherical surface has a negative refractive power; and
- wherein said objective lens system satisfies the following conditions (2) and (3):

$$0.2 < |r_1/D_1| < 6.0 \tag{2}$$

$$D_2/f > 0.1 \tag{3}$$

wherein the reference symbol $r_1$ represents a radius of curvature on the most object side surface of the meniscus lens component, the reference symbol $D_1$ designates distance as measured from an object to the object side surface of said meniscus lens component, the reference symbol $D_2$ denotes thickness of said meniscus lens component and the reference symbol $f$ represents focal length of the objective lens systems as a whole.

42. An objective lens system for microscopes comprising:
- a lens component disposed on the most object side having a convex surface on the image side; and
- a cemented doublet;
- wherein a lens component disposed on the image side has a meniscus shape concave toward the image side;
- wherein said objective lens system comprises at least two aspherical surfaces, at least one of which has a shape that strengthens refractive power thereof as portions of said aspherical surface are farther from the optical axis; and
- wherein the reference sphere of this aspherical surface has a negative refractive power and said aspherical surface satisfies the following condition (1'):

$$0.0003 < |\Delta x/y_A| < 0.3 \tag{1'}$$

wherein the reference symbol x represents a deviation in a direction along the optical axis and at a maximum height of rays on each of said aspherical surfaces between said aspherical surface and a spherical surface having the same curvature as that at a vertex of a spherical surface in contact with said aspherical surface and the reference symbol $y_A$ designates the maximum height of a ray on said aspherical surface.

43. An objective lens system for microscopes comprising:
- a lens component disposed on the most object side having a convex surface on the image side; and
- a cemented doublet;
- wherein said objective lens system comprises at least two aspherical surfaces, at least one of which has a shape that strengthens refractive power thereof as portions of said aspherical surface are farther from the optical axis; and
- wherein the reference sphere of said at least one aspherical surface has a negative refractive power and said at least one aspherical surface satisfies the following condition (1'):

$$0.003 < |\Delta x/y_Z| < 0.3 \tag{1'}$$

wherein the reference symbol $\Delta x$ represents a deviation in a direction along the optical axis and at a maximum height of rays on each of said aspherical surfaces between said aspherical surface and a spherical surface having the same curvature as that at a vertex of a spherical surface in contact with said aspherical surface and the reference symbol $y_A$ designates the maximum height of a ray on said aspherical surface.

44. An objective lens system for microscopes comprising:
- a lens component disposed on the most object side and having a convex surface on the image side; and
- a cemented doublet;
- wherein said objective lens system comprises two aspherical surfaces, at least one of which has such a shape as to strengthen a refractive power thereof as portions of this aspherical surface are farther from the optical axis,
- wherein the reference sphere of this aspherical surface has a negative refractive power; and
- wherein said objective lens system satisfies the following condition (9):

$$0.3 < f_1/f < 1.5 \tag{9}$$

wherein the reference symbol $f$ represents focal length of said objective lens system as a whole and the reference symbol $f_1$ designates focal length of the lens component arranged on the object side.

45. An objective lens system for microscopes comprising:
- a lens component disposed on the most object side and having a convex surface on the image side; and
- a cemented doublet;
- wherein said lens component disposed on the most object side has at least one aspherical surface and a lens components disposed on the most image side in said objective lens system also has at least one aspherical surface; and wherein said objective lens system comprises at least one aspherical surface with such a shape as to strengthen the refractive power thereof as the portions of said aspherical surface are farther from the optical axis and a reference sphere of this aspherical surface has a negative refractive power.

46. An objective lens system for microscopes comprising;
   a plano-convex lens component disposed on the most object side; and
   a cemented doublet disposed on an emergence side of said plano-convex lens component;
   wherein at least one lens surface is an aspherical surface having such a shape as to weaken refractive power thereof as portions of said aspherical surface are farther from the optical axis; and
   wherein a reference sphere of said aspherical surface has positive refractive power.

47. An objective lens system for microscopes comprising:
   a plano-convex lens component disposed on the most object side; and
   a cemented doublet disposed on an emergence side of said plano-convex lens component;
   wherein at least one lens surface is an aspherical surface having such a shape as to strengthen refractive power thereof as portions of said aspherical surface are farther from the optical axis, and
   wherein a reference sphere of said aspherical surface has negative refractive power.

48. An objective lens system for microscopes comprising:
   a lens component disposed on the most object side and having a convex surface on the image side; and
   a cemented doublet having a cemented surface;
   wherein said cemented surface is an aspherical surface.

49. An objective lens system for microscopes according to claim 48 comprising, a second aspherical surface which is convex toward the image side and has such a shape as to weaken refractive power thereof as portions of said second aspherical surface are farther from the optical axis.

* * * * *